United States Patent [19]
Tsuchiya et al.

[11] Patent Number: 5,319,482
[45] Date of Patent: Jun. 7, 1994

[54] OPTICAL LOOP BACK AND LINE TEST APPARATUS

[75] Inventors: Toshiyuki Tsuchiya; Jun Sato, both of Yokohama; Kazuyoshi Ohno, Fujimi; Satoyuki Matsui, Kamakura, all of Japan

[73] Assignee: Nippon Telegraph and Telephone Corporation, Tokyo, Japan

[21] Appl. No.: 833,111

[22] Filed: Feb. 10, 1992

[30] Foreign Application Priority Data

Feb. 12, 1991 [JP] Japan .................................. 3-018982

[51] Int. Cl.⁵ ...................... H04B 10/08; H04B 10/00
[52] U.S. Cl. .................................. 359/110; 359/117; 359/127; 359/128; 359/152; 356/73.1
[58] Field of Search ................ 359/110, 114, 118, 124, 359/152, 161, 166, 173, 177, 188, 195, 117, 115, 128, 127; 356/73.1; 385/14

[56] References Cited

U.S. PATENT DOCUMENTS

| | | | |
|---|---|---|---|
| 4,737,026 | 4/1988 | Dalgoutte et al. | 356/73.1 |
| 4,911,515 | 3/1990 | So et al. | 359/152 |
| 5,077,729 | 12/1991 | Wong | 359/110 |
| 5,093,568 | 3/1992 | Maycock | 356/73.1 |

Primary Examiner—Richard E. Chilcot, Jr.
Assistant Examiner—Rafael Bacares
Attorney, Agent, or Firm—Finnegan, Henderson, Farabow, Garrett & Dunner

[57] ABSTRACT

A testing apparatus is presented which evaluates the performance of optical signal transmissions in the 1.3 μm wavelength region, independently or simultaneously with signal transmission. An optical signal is transmitted in the network→user direction in a thermo-optic (TO) switch 11, and the signal is also looped in the direction A of an optical directional coupler 3. An optical time domain reflectometer (OTDR) 10 Generates a test beam at 1.55 μm wavelength region, which is reflected by a wavelength selective filter 8 back to the OTDR 10 in the user-network direction. The apparatus is thus able to perform testing of the transmission cable 7 simultaneously with the signal transmission. When an operating problem is to be pinpointed in the system, the optical switch 11 is switched so as to permit the signal from a line terminal LT 1 to transmit in the network-→user direction. The signal is attenuated by the same magnitude as the loss budget between the terminals NT 9 and LT1, and is looped back to LT 1, thereby enabling Loop 1 testing at the same signal strength level as in the actual signal transmission.

20 Claims, 7 Drawing Sheets

FIG.4
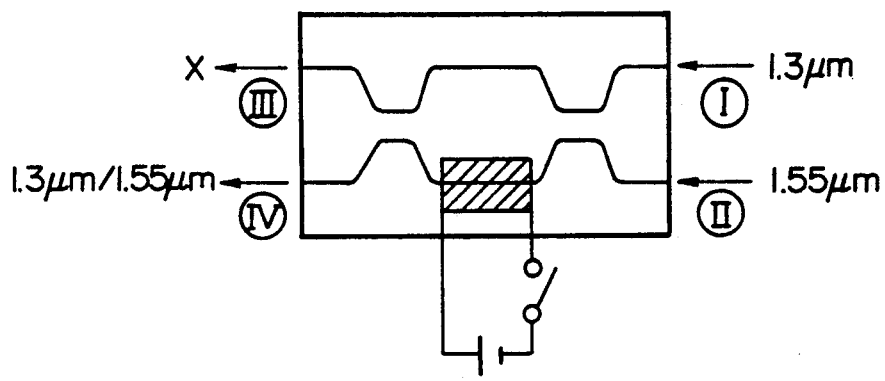
FIG.5
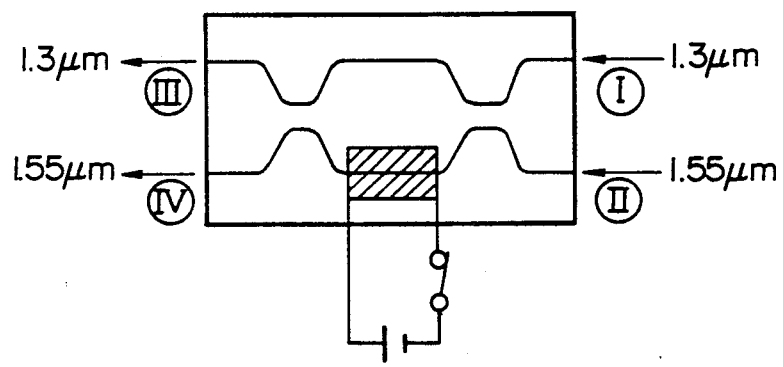
FIG.6
| ELECTRICAL POWER | OUTPUT BEAM FROM PORT III | OUTPUT BEAM FROM PORT IV |
|---|---|---|
| OFF | — | 1.3 μm<br>1.55 μm |
| ON | 1.3 μm | 1.55 μm |

OPTICAL LOOP BACK AND LINE TEST APPARATUS

BACKGROUND OF THE INVENTION

This invention relates to an apparatus for performing optical loop back and line tests in an optical subscriber transmission system.

FIG. 1 is a schematic block diagram of the testing set-up specified by the CCITT (International Telegraph and Telephone Consultative Committee). This figure illustrates the basics of Loop 1 test, in which the signal transmitted from the network-side to the line terminal LT is returned back to the network-side at the user-side of the line terminal LT. In Loop 2 test, the signal transmitted from the network-side to the user-side is looped back at the user-side of the network terminal NT 1 to the network-side. These two tests are concerned with evaluating the network-side of the communication system. Loop C test is concerned with evaluating the user-side of the system, including the network terminal NT 1, by sending the signal sent from the terminal equipment TE1 to NT 1 back to TE1 at the network-side of the network terminal NT 1.

The two conventional methods of testing the optical subscriber transmission system will be explained with reference to FIG. 2.

The first test is concerned with evaluating the performance of the transmission cable 7 between LT and NT. The method of testing, as explained in detail in a report, a first reference, ("Fiber line Support System-AURORA & FITAS", N. Tomira, K. Sato and I. Nakamura, NTT Review, vol. 3, No.1, January, 1991), utilizes a test beam generated by an optical time domain reflectometer (OTDR) 10, which is passed through a optical directional coupler 3 into a transmission cable 7, and is reflected at a wavelength selection filter 8 (which selectively transmits the optical signal beam of a certain wavelength but reflects the test beam of testing wavelength) back into the OTDR 10. This test is for evaluating the cable 7 in the transmission Region II between the optical directional coupler 3 and the user/network division point. The optical directional coupler 3 (henceforth referred to as the directional coupler 3) is provided with a terminal T1 on the network-side, a terminal T2 on the user-side and a terminal T3 on the OTDR-side. The directional coupler 3 used in this test has a special characteristic of generating an asymmetric coupling ratio: a low value attenuation between T1—T2 and a high value of attenuation between T2—T3. To prevent adversely affecting the performance of the transmission cable 7 by the reflected test beam, reflected at the user/network division point and transmitting through the path T2—T1, the system is provided with a wavelength selection filter 8 (henceforth referred to as the optical filter 8) so as to reflect on the test beam back into OTDR 10.

The second group of tests is concerned with evaluating the performance of the system in Loop 1 and Loop 2. The signal transmitted from network-side is looped back at LT (Loop 1) and at NT (Loop 2). These test are all tests based on electrical looping back.

The conventional testing methodology is acceptable when the loop back point coincides with the user-network interface (T reference point). For example, with reference to FIG. 2, Loop 2 test is able to identify whether a problem exists in the network-side. That is, if no problem is found by Loop 2 test, the performance of the transmission line between LT 1 and T reference point is deemed to be problem-free. However, because there have been cases of NT 9 being owned by the users, there has been a Growing demand in recent years for Loop C test which can evaluate the performance of the user-side of the transmission system including any optical devices, and which can identify problems in the network-side separately from those in the user-side.

The problems with the conventional transmission line test (henceforth referred to as the line test) and the methodology for Loop 1 and Loop 2 tests are summarized in the following.

(1) The line test is only for region II, and it was not possible to test for the regions I and III, and it was time-consuming to identify faults in the system.

(2) Even if the OTDR is applied to testing of the region III, because the conventional tests are designed for measuring only the transmission loss and reflection attenuation, the optical transmission performance (such as optical pulse width, extinction ratios and noises in the receiver) in LT 1 could not be evaluated.

(3) The Loop 2 test is able to perform overall testing of the regions I, II and III, but because it is not able to distinguish these regions, it was not able to pinpoint the fault point.

(4) Because an optical testing device for performing Loop 1 test within LT 1 was not available, it was only possible to conduct simulation testing by an electrically looping the signal without being able to access OS/OR in LT 1, thus forcing evaluation of the circuit performance within LT 1 to be performed manually.

SUMMARY OF THE INVENTION

The objective of the invention is to present an apparatus which is able to perform loop back test of the optical transmission system including OS (optical transmitter) and OR (optical receiver) devices, and which enables line testing, irrespective of whether the system is in the loop back test mode or in the normal transmission mode. Therefore, the invention presented in claim 1 is, concerned with an apparatus for evaluating the performance of a single cable bi-directional optical transmission system operating in a directional division multiplexing (DDM) mode, said system operating an optical signal transmission cable joining a line terminal and a network terminal, and transmitting an optical signal in a first wavelength region; said apparatus having: The apparatus consists of the following main components:

(a) an optical time domain reflectometer (OTDR) operating a test beam in a second wavelength region;

(b) a 1×2 optical directional coupler provided with a first, a second, and a third coupler terminals: wherein the coupling ratio is chosen so that the insertion loss between the first coupler terminal and the second coupler terminal is design to be low, and the insertion loss between the third coupler terminal and the first coupler terminal is designed to be slightly less than twice the loss budget between the line terminal and the network terminal, and wherein the first coupler terminal is connected to the user-side of the line terminal; and (c) a 2×2 optical switch having:
a first, a second, a third and a fourth switch terminals, wherein
the first switch terminal is connected to the second coupler terminal of said 1×2 optical directional coupler, a test beam Generated by said OTDR is inputted into the second switch terminal, and the third switch terminal is connected to the third coupler terminal of said 1×2 optical directional coupler and the fourth switch terminal is connected to the transmission cable;

wherein during the normal signal transmission mode, said first switch terminal and second switch terminal are both optically connected to said fourth switch terminal, and a switch over operation is performed by optically connecting said first switch terminal to said third switch terminal, and optically connecting said second switch terminal to said fourth switch terminal.

The apparatus presented in claim 3 is concerned with an apparatus for evaluating the performance of a two cable bi-directional optical transmission system operating in a space division multiplexing (SDM) mode, said system operating an optical signal transmission cable Joining a line terminal and a network terminal, and transmitting an optical signal in a first wavelength region; the apparatus has the following main components:

(a) an optical time domain reflectometer (OTDR) generating a test beam in a second wavelength region;

(b) a first 2×2 optical switch having: a first, a second, a third and a fourth switch terminals, wherein during the normal signal transmission mode, the first and the second switch terminals are both optically connected to the fourth switch terminal and in a switch over mode, the first and the second switch terminals are connected optically to the third and the fourth switch terminals, respectively, and a test generated by said OTDR is inputted into the second switch terminal, and the first switch terminal is connected to an optical transmitter (OS) of said line terminal and fourth switch terminal is connected to the opposite end of the optical signal transmission cable connected to said network terminal;

(c) a second 2×2 optical switch having:
a first, a second, a third and fourth switch terminals, and wherein in the normal signal transmission mode, the first and second switch terminals are both optically connected to the fourth switch terminal, and during a switch over mode, the first and second switch terminals are, respectively, connected optically to the third and fourth switch terminals respectively wherein a test beam generated by said OTDR is inputted into the second switch terminal, and the first switch terminal is connected to an optical receiver (OR) terminal of said line terminal and the fourth switch terminal is connected to the transmission cable;

(d) an optical attenuator inserted between the third switch terminal of said first 2×2 optical switch and the third switch terminal of said second 2×2 optical switch; said attenuator generating an attenuation magnitude which is slightly smaller than the signal attenuation in the transmission line between said line terminal and network terminal.

According to the claim presented in claim 5, an apparatus is presented for evaluating the performance of a single cable hi-directional optical transmission system operating in a directional division multiplexing (DDM) mode, said system operating an optical signal transmission cable Joining a line terminal and a network terminal, and transmitting an optical signal in a first wavelength region; the apparatus includes:

(a) a 1>2 optical directional coupler provided with a first, a second and a third coupler terminals wherein the first coupler terminal is connected to a network-side of said network terminal; said directional coupler having a coupling ratio chosen so that the insertion loss between the first and second coupler terminals is design to be low, and the insertion loss between the first and third coupler terminals is designed to be slightly less than twice the budget loss between the line terminal and the network terminal and (b) a 1×2 optical switch having a first, a second, a third, and a fourth switch terminal; wherein the first switch terminal is connected to said third coupler terminal of said 1×2 optical directional coupler, and the second switch terminal is connected to said third coupler terminal of said 1×2 optical directional coupler and said fourth switch terminal is connected to the end of the opposite side of the line terminal;

wherein during the normal signal transmission mode, the first switch terminal is connected optically with the fourth switch terminal, and in a switch over mode, the first switch terminal is optically connected with the third switch terminal.

According to the claim presented in claim 7, an apparatus is presented for performing simultaneous loop back test for a two cable bi-directional optical transmission system operating in a space division multiplexing (SDM) mode, transmitting a signal beam in two cables Joining NT and LT; the apparatus having:

(a) a first 1×2 optical switch having: a first, a second, a third, and a fourth switch terminals; wherein, in a normal signal transmission mode, the first switch terminal is optically connected to the fourth switch terminal, and in a switch over mode, the first switch terminal is connected optically to the third switch terminal, and said first switch terminal is connected to an optical transit (OS) of said network terminal, and said fourth switch terminal is connected to the transmission cable;

(b) a second 1×2 optical switch having:
a first, a second, a third, and a fourth switch terminals; wherein, in a normal signal transmission mode, the first switch terminal is connected optically to the fourth switch terminal, and in a switch over mode, the first switch terminal is connected optically to the third switch terminal, and the first switch terminal is connected to an optical receiver (OR) of said network terminal and said fourth switch terminal is connected to the transmission cable; and (c) an optical attenuator inserted between the third switch terminal of said first 1×2 optical switch and said third switch terminal of said second 1×2 optical switch; said attenuator generating an attenuation whose magnitude is slightly smaller than the loss budget in the transmission cable between said line terminal and the network terminal.

According to the apparatus of the above construction, the apparatus is able to provide both the normal signal transmission and the loop back test including OS/OR devices, by switching the operating modes between the transmission mode and the test mode in the first wavelength region (1.3 μm region), the test beam operating in the second wavelength region (1.55 μm) is always evaluated through the optical cable of the transmission line between the OTDR and the wavelength selective filter, regardless of the status of the switching mode. Therefore, loop back test and line test can be performed from a common access point in the system, either independently or simultaneously with optical signal transmission. Further, in a non-dispersive optical transmission system, by allowing the test signal to loop back at the same propagation loss as in the transmission cable, the apparatus is able to test the optical signal transmission characteristics (such as optical pulse width, extinction ratios and noises in the receiver) of the equipment in the network-side LT 1 and the user-side NT 9.

BRIEF DESCRIPTION OF THE DRAWINGS

FIG. 4 shows the operational characteristics of a TO (thermo-optic) type optical switch of the first embodiment.

FIG. 5 shows further operational characteristics of a TO type optical switch of the first embodiment.

FIG. 6 is a summary Table for the characteristics of the TO type optical switch of the first embodiment.

PREFERRED EMBODIMENT OF THE PRESENT INVENTION

Preferred embodiments are explained with reference to the figures.

First Embodiment

Figure 1:
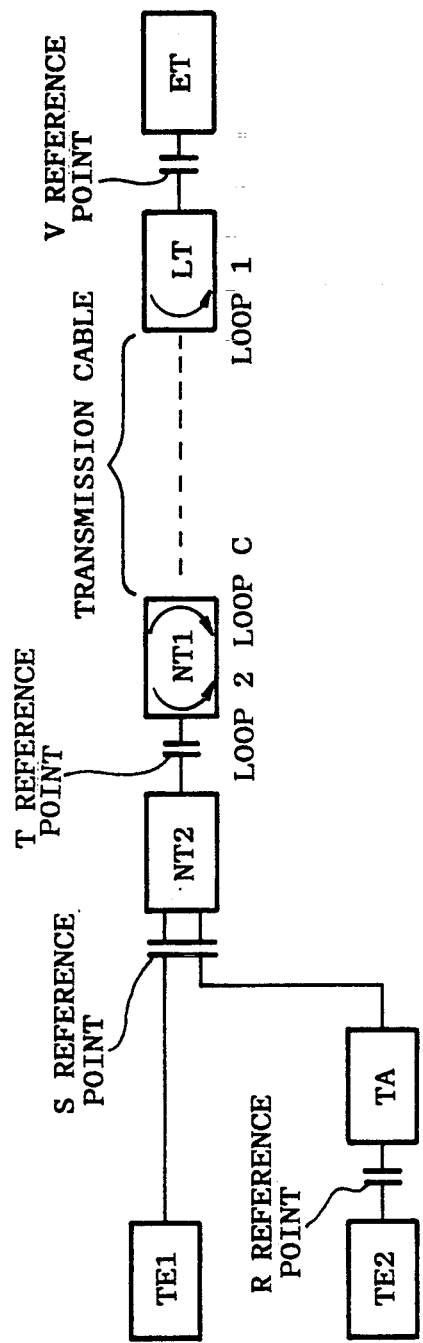
FIG. 1 is a block diagram of the loop back test specified by CCITT.
Figure 2:
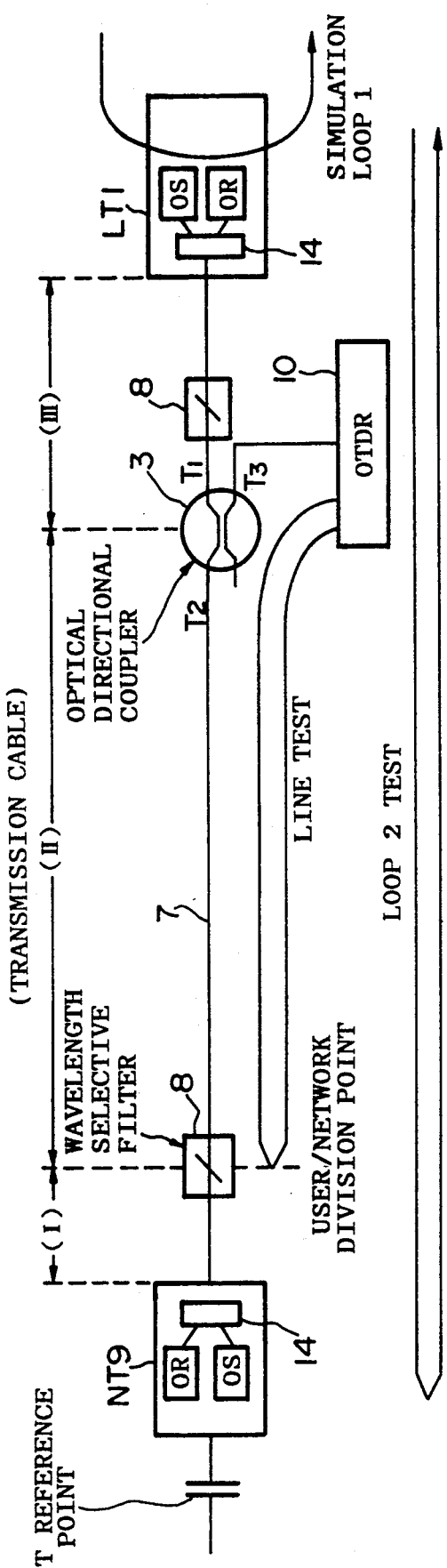
FIG. 2 is a block diagram of the conventional methodology for optical subscriber line testing.
Figure 3:
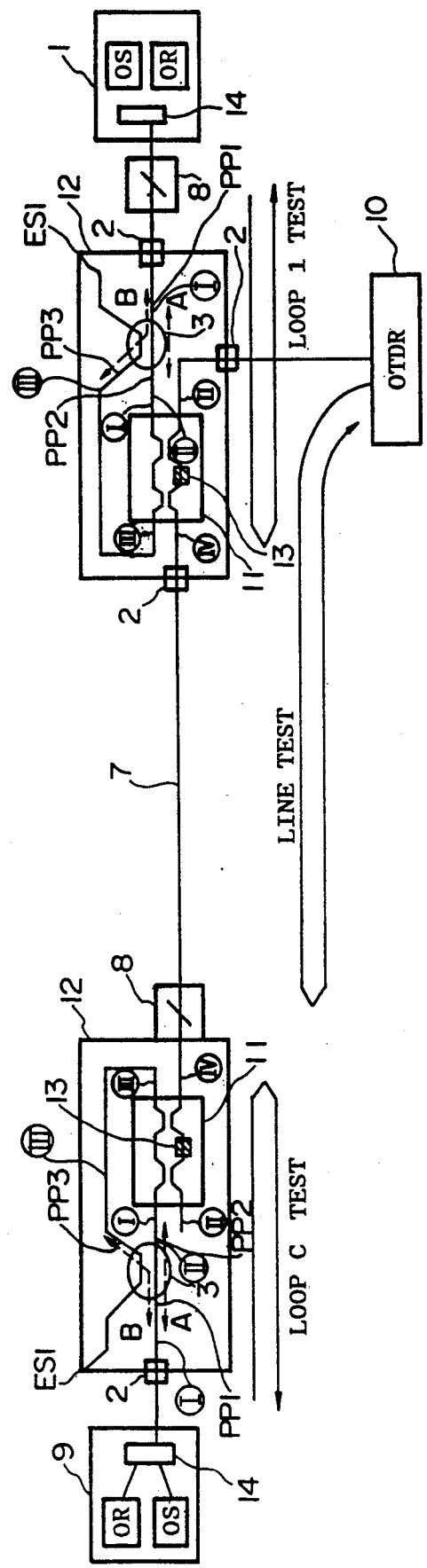
FIG. 3 is a block diagram of the testing system of a first preferred embodiment.

FIG. 3 is a schematic block diagram to explain the features of the first embodiment, in which an transmission cable 7 transmits bi-directional signals, through a thermo-optic (TO) switch which exhibits different behaviors in the 1.3 μm and the 1.55 μm wavelength regions, depending on the activation of the thermo-optic effect presented in a second reference (N. Takato, K Jinguji, M. Yasu, H. Toba and M. Kawachi "Silica-based Single Mode Waveguides on Silicon and their Application to Guided-Wave Optical Interferometers", Journal of Lightwave Technology, vol. 6, No. 6, pp 1003-1010, June, 1988). The operation of this TO switch will be explained shortly.

In FIG. 3, 1 represents a line terminal LT, 2 is an optical connector, 3 is a directional coupler, which the coupling ratio is set so that the optical attenuation is low in the A direction shown by an arrow A, and the optical attenuation in the direction of an arrow B is set slightly less than twice the loss budget between NT9 and LT7. The open-end terminal surface ES1 of this coupler 3 is sliced at an angle for the reasons which will be explained later. The numeral 8 represents an optical wavelength selective filter (optical filter), 9 is a network terminal NT, 10 is an OTDR, 11 is a TO-activated 2×2 optical switch for the 1.3 μm region (referred to as the 1.3 μm switch 11), having different operating characteristics in the 1.3 and 1.55 μm wavelength regions, 12 is a loop back/line test apparatus equipped with the directional coupler 3 and the 2×2 optical switch 11, 13 is a thin film heater, and 14 is an optical directional coupler. There is a test apparatus provided for both sides of the cable 7; the LT 1 side (the network-side) and the NT 9 side (the user-side).

The operating characteristics of the 1.3 μm switch will be explained with reference to FIGS. 4 to 6. One of the waveguides is provided with a thin film heater FIG. 4 shows the operating status of the switch when the electrical power to the thin film heater 13 is off. In this condition, when a 1.3 μm input beam is entered into port I, and a 1.55 μm input beam into port II, both 1.3 and 1.55 μm output beams exit from the port IV. FIG. 5 shows the operating status of the switch 11 when the power to the thin film heater 13 is on. As illustrated in this figure, for the same input signals, the output beams are 1.3 μm from port III and 1.55 μm from the port IV. The results shown in the summary table presented in FIG. 6 demonstrate that an application of electrical power to the heater enables switching of the output port of the 1.3 μm beam but the output port of the 1.55 μm beam remain the same.

The difference in the activation behaviors of the 1.3 μm switch is explained in terms of the beam intensity relationships shown in the second reference as follows.

$$I_1/I_0 = (1 - 2k)^2 \cdot \cos^2(\phi/2) + \sin^2(\phi/2)$$

$$I_2/I_0 = 4k(1 - k) \cdot \cos^2(\phi/2)$$

where k is the coupling ratio of the directional coupler in the optical switch, $\phi$ is the phase shift caused by the thin film heater, $I_0$ is the input intensity and $I_1$ is the output intensity from the port in parallel with input line, and $I_2$ is the output intensity from the cross port. For the 1.3 μm signal, k is 0.5 (50%), and with power off ($\phi=0$), $I_1/I_0=0$ and $I_2/I_0=1$, and the input signal into port I is outputted from port IV. With power on ($\phi=\pi$), $I_1/I_0=1$ and $I_2/I_0=0$, the input signal into port I is outputted from port III. For the 1.55 μm signal, k is 0.9 (90%), and because $I_1/I_0$ becomes greater than 0.64 for a given $\phi$, input signal into port II is always outputted from port IV.

It should be noted that even if the test wavelength from the OTDR becomes longer than 1.55 μm in the future the value of k becomes (will be) larger than 90%, and as a result, the input signal into port I will always be outputted from port IV, and the same effects as with the 1.55 μm is obtained.

Figure 7:
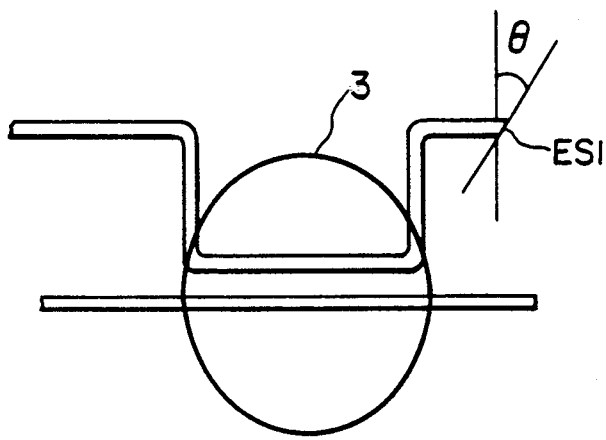
FIG. 7 illustrates an angled cut of the open-end of a directional optical coupler of the first embodiment.
Figure 8:
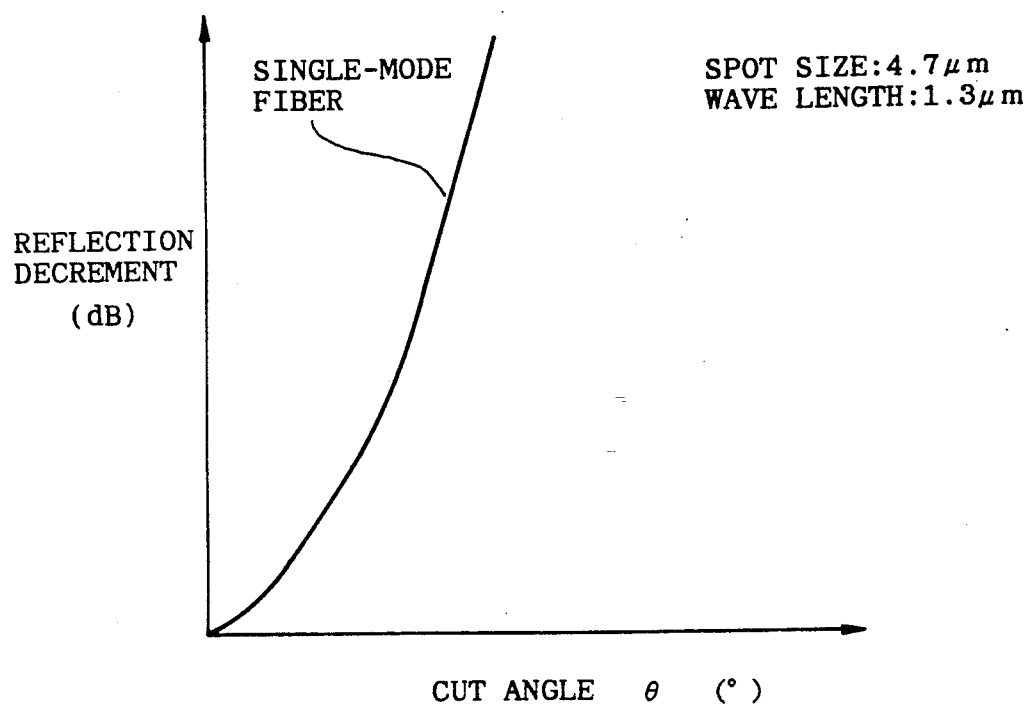
FIG. 8 illustrates the attenuation characteristics of the reflected beam at the angle cut surface.

In the operation of the directional coupler 3, if the end surface of the open-end terminal ES1 is sliced perpendicular to the signal transmission path, Fresnel reflections are generated at the open surface, and when the reflected beam reaches the OS, it worsens the relative intensity noise (RIN) and degrades the waveform of the optical signal. Also, if the reflected beam reaches the OR, the noise reaches the same level as the noise superimposed on the optical signal. Therefore, to control such undesirable reflections, the open-end terminal surface ES1 of the directional coupler 3 is sliced at an angle to the path of optical beam transmission, as shown in FIG. 7. The effect of the angle of cut on reflectivity is shown in FIG. 8, which shows that the larger the cut angle e the larger the reflection decrement.

The operation of the first embodiment will be explained with reference to FIG. 3. In the normal signal transmission mode in the 1.3 μm region, the directional coupler S transmits an optical signal in the A direction, and simultaneously, in the optical switch 11 the signal is transmitted in the direction I→IV. An OTDR 10 Generates a 1.55 μm test beam, which passes through the optical switch 11 in the direction II→IV to reach an optical filter 8, and is reflected back to the network-side. The reflected beam returns to the OTDR 10 via the cable 7 and through the optical switch 11 in the direction IV→II. The optical paths of the 1.55 μm test beam which interfere with the signal transmission are: when the reflected beam from the optical filter 8 Goes through the paths IV→I→PP2→PP1, II→III→PPS→PP1 (B direction) and II→III→PP-S→ES1→PP3→III→I→PP2→PP1. Such paths are blocked by inserting an optical filter 8 (which reflects only the test beam) in between the LT 1 and the apparatus 12. The line test in the cable 7, along with the normal signal beam transmission, are thus carried out. In cases of malfunctioning, the loop back test is performed by switching the optical switch 11 so as to transmit the 1.3 μm signal beam from LT 1 in the direction I→III. As a result of passing through the directional coupler 3 in the B direction, the signal beam is given the same degree of attenuation as the signal beam which passes through the line between NT 9 and LT 1, and is looped back to LT 1. This is how the Loop 1 test is performed at the same optical signal level as during the normal signal transmission. At the same time, the 1.55 μm test beam is transmitted in the direction II→IV, reflected by the optical filter 8 and returns to the OTDR after passing through the switch 11 in the direction IV→II. This is how the line test is performed simultaneously with the loop test. Loop C test is performed in a similar way as the above described Loop 1 test.

Second Embodiment

Figure 9:
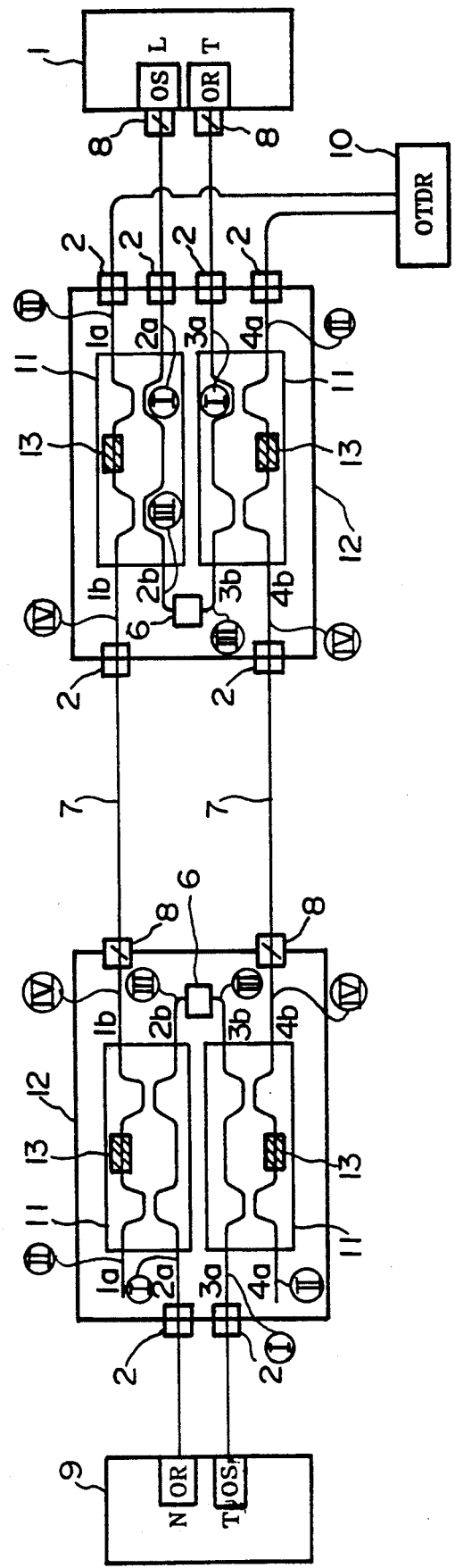
FIG. 9 is a block diagram of the testing system of a second preferred embodiment.

FIG. 9 is a block diagram to show the construction of a second embodiment, in which two transmission cables 7 transmit bi-directional signals in the 1.3 μm region, in combination with two TO-activated optical switches 11 for the 1.3 μm optical signal having two different TO-activation characteristics for the 1.3 and 1.55 μm beams. The designations are the same as in the first embodiment, and are summarized as follows: 1 is a line terminal LT, 2 is an optical connector, 6 is an optical attenuator which provides the same degree of attenuation as that between the NT and LT, 7 is an transmission cable, 8 is an optical wavelength selective filter, 9 is a NT, 10 is an OTDR (Optical Time Domain Reflector), 11 is a 2×2 optical switch for the 1.3 μm region having the same type of operating features as the switch 11 of the first embodiment, 12 is a loop back/line test apparatus and is a thin film heater for controlling an optical switch 11.

Figure 10:
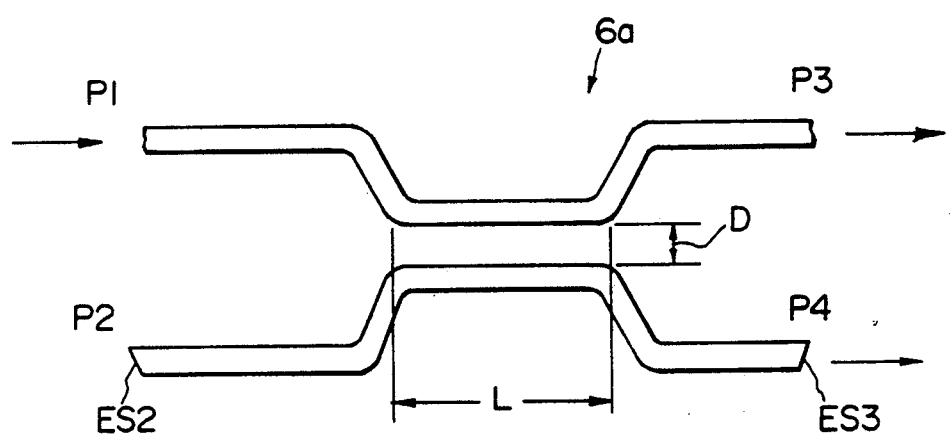
FIG. 10 illustrates one example of fabricating an optical attenuator for providing a specific optical attenuation.

The structural features of the optical attenuator 6 are explained with reference to FIGS. 10 and 11. FIG. 10 illustrates an example of the attenuator 6 with the use of an optical directional coupler 6a. This optical directional coupler 6a is made of wave guides fabricated on a common silicon substrate, similar to the previous directional coupler 3, in which a portion of each wave guide is disposed closely parallel to each other. The coupling ratio is varied by changing the separation distance D and the length L of the parallel proximity part. By selecting the distance D and the length L appropriately in the directional coupler 6a, it becomes possible to forward the input beam from port P1 to port P3 while generating an attenuated coupled beam according to the designed coupling ratio and transmitting the coupled beam to port P4. This is how the input beam is attenuated by a specific amount and transmitted to port P3. When the ports P1 and P3 are used as a transmission route, the open-end terminal surfaces ES2 of the respective unused port P4 must be sliced at an angle as in the case of the open-end terminal surface ES1 of the optical directional coupler 3.

Figure 11:
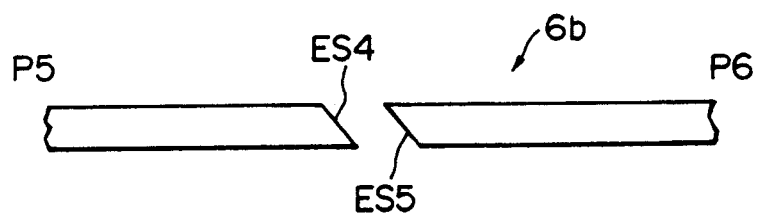
FIG. 11 illustrates another example of fabrication the optical attenuator for providing a specific optical attenuation.

FIG. 11 illustrates an example of the fabrication of an optical attenuator 6b by providing a spacing in the transmission path of a waveguide in the optical attenuator 6. The open-end terminal surfaces ES4 and ES5 are sliced at an angle for the same reason as that for the open-end terminal surface ES1. By providing such a spacing in the optical signal transmission path, an optical attenuation is given to the signal passing between the ports P5 and P6.

In a system according to this embodiment shown in FIG. 9, the normal transmission of 1.3 μm optical signal is carried out through the optical switch 11 in the directions 2a→1b and 4b→3a. Further, a test beam of 1.55 μm is generated from the OTDR 10, transmitted in the directions 1a→1b, 4a→4b, reflected by the optical filter 8, and each beam is returned to OTDR 10 in the direction 1b→1a and 4b→4a, respectively. This is how the line test is carried out simultaneously with and independently of the normal signal transmission. To conduct loop back/line tests (Loop 1 test/line test) to pinpoint a faulty operation in the system, the two switches 11 are activated at the same time to transmit the signal beam forwarded from LT 1 in the direction 2a→2b and is returned to LT 1 in the direction 3b→3a, after being given an attenuation magnitude which is slightly less than the attenuation between NT 9 and LT 1, in the optical attenuator 6, thereby performing Loop 1 test at the same optical signal strength level as in the normal signal transmission mode. At the same time, a test beam of 1.55 μm is generated from the OTDR 10, forwarded to the optical filter 8 through 1a→1b and 4a→4b, reflected by the optical filter 8 and is returned to OTDR 10 via 1b→1a and 4b→4a, thereby performing the line test simultaneously with and independently of the loop back test. Loop C test is performed in the same way as the above described Loop 1 test. As explained above, according to this invention, the inventive features of the test apparatus are:

(1) The apparatus is able to perform loop back test (Loop C) in the region between NT 9 and the user/network division point including OS/OR devices, and under the same condition of signal attenuation during the normal signal transmission (between NT and LT), from the user side.

(2) The apparatus is able to conduct automatic loop back test (Loop 1) including OS/OR, and under the same signal attenuation condition as during the normal signal transmission (between NT and LT), thereby enabling pinpointing of the fault point readily and with reducing manpower requirements.

(3) Because the optical testing circuits are integrated on a common silicon substrate, the apparatus is superior to the conventional devices in terms of the practicality, economy and low insertion loss.

(4) Multi-modal line test can be performed irrespective of the operating modes of the system, transmission or testing mode.

(5) In comparison with the conventional system, in which while the propagation loss in the NT←→LT direction was kept low the attenuation in the OTDR←→NT direction was increased; in the test apparatus of the present invention, the attenuation in the OTDR→NT direction becomes low by design, and the output optical power from the OTDR can be decreased compared with the conventional system. (6) The loop back/line test is performed from the same access point in the system, thereby allowing easy pinpointing of the fault point in the system.

What is claimed is:

1. An apparatus for evaluating the performance of a single cable bi-directional optical transmission system operating in a directional division multiplexing (DDM) mode, said system operating an optical signal transmission cable Joining a line terminal and a network terminal, and transmitting an optical signal in a first wavelength region; said apparatus having:
   (a) an optical time domain reflectometer (OTDR) operating a test beam in a second wavelength region;
   (b) a 1×2 optical directional coupler provided with a first, a second, and a third coupler terminals: wherein the coupling ratio is chosen so that the insertion loss between the first coupler terminal and the second coupler terminal is design to be low, and the insertion loss between the third coupler terminal and the first coupler terminal is designed to be slightly less than twice the loss budget between the line terminal and the network terminal, and wherein the first coupler terminal is connected to the user-side of the line terminal; and
   (c) a 2×2 optical switch having:
   a first, a second, a third and a fourth switch terminals, wherein
   the first switch terminal is connected to the second coupler terminal of said 1×2 optical directional coupler, a test beam Generated by said OTDR is inputted into the second switch terminal, and the third switch terminal is connected to the third coupler terminal of said 1×2 optical directional coupler and the fourth switch terminal is connected to the transmission cable;
   wherein during the normal signal transmission mode, said first switch terminal and second switch terminal are both optically connected to said fourth switch terminal, and a switch over operation is performed by optically connecting said first switch terminal to said third switch terminal, and optically connecting said second switch terminal to said fourth switch terminal.

2. A loop back/line test apparatus as claimed in claim 1, wherein said 2×2 optical switch is provided with a thermo-optic (TO) effect device fabricated integrally on a silicon substrate common with silicon waveguides, said device comprises a thin film heater which, when electrical power to said heater is turned on, alters the transmission terminal of said first wavelength region only, and said second wavelength region is transmitted through unaltered through the same terminal as when the power is off.

3. An apparatus for evaluating the performance of a two cable bi-directional optical transmission system operating in a space division multiplexing (SDM) mode, said system operating an optical signal transmission cable joining a line terminal and a network terminal, and transmitting cable joining a line terminal and a network terminal, and transmitting an optical signal in a first wavelength region; said apparatus having:
   (a) an optical time domain reflectometer (OTDR) generating a test beam in a second wavelength region;
   (b) a first 2×2 optical switch having: a first, a second, a third and a fourth switch terminals, wherein during the normal signal transmission mode, the first and the second switch terminals are both optically connected to the fourth switch terminal, and in a switch over mode, the first and the second switch terminals are connected optically to the third and the fourth switch terminals, respectively, and a test beam generated by said OTDR is inputted into the second switch terminal, and the first switch terminal is connected to an optical transmitter (OS) of said line terminal and the fourth switch terminal is connected to opposite end of the optical signal transmission cable connected to said network terminal;
   (c) a second 2×2 optical switch having:
   a first, a second, a third, and fourth switch terminals, and wherein in the normal signal transmission mode, the first and second switch terminals are both optically connected to the fourth switch terminal, and during a switch over mode, the first and second switch terminals are, respectively, connected optically to the third and fourth switch terminals, respectively, wherein a test beam generated by said OTDR is inputted into the second switch terminal, and the first switch terminal is connected to an optical receiver (OR) terminal of said line terminal and the fourth switch terminal is connected to the transmission cable;
   (d) an optical attenuator inserted between the third switch terminal of said first 2×2 optical switch and the third switch terminal of said second 2×2 optical switch; said attenuator generating an attenuation magnitude which is slightly smaller than the signal attenuation in the transmission line between said line terminal and network terminal.

4. A loop back/line test apparatus as claimed in claim 3, wherein said 2×2 optical switches are provided with a thermo-optic (TO) effect device fabricated integrally on a silicon substrate common with silicon waveguides, said device comprises a thin film heater which, when electrical power to said heater is turned on, alters the transmission terminal of said first wavelength region only, and said second wavelength region is transmitted through unaltered through the same terminal as when the power is off.

5. An apparatus for evaluating the performance of a single cable bi-directional optical transmission system operating in a directional division multiplexing (DDM) mode, said system operating an optical signal transmission cable joining a line terminal and a network terminal, and transmitting an optical signal in a first wavelength region; said apparatus includes:
   (a) a 1×2 optical directional coupler provided with a first, a second and a third coupler terminals wherein the first coupler terminal is connected to a network-side of said network terminal; said directional coupler having
   a coupling ration chosen so that the insertion loss between the first and second coupler terminals is designed to be low, and the insertion loss between the first and third coupler terminals is designed to be slightly less than twice the budget loss between the line terminal and the network terminal, and
   (b) a 1×2 optical switch having a first, a third, and a fourth switch terminal; wherein
   the first switch terminal is connected to said second coupler terminal of said 1×2 optical directional coupler, and the third switch terminal is connected to said third coupler terminal of said 1×2 optical directional coupler and said fourth switch terminal is connected to the end of the opposite side of the line terminal; wherein during the normal signal transmission mode, the first switch terminal is connected optically with the fourth switch terminal, and in a switch over mode, the first switch terminals is optically connected with the third switch terminal.

6. A loop back test apparatus as claimed in claim 5, wherein said 1×2 optical switch is provided with a thermo-optic (TO) effect device fabricated integrally on a silicon substrate common with waveguides, said device comprises a thin film heater having an on-state and an off-state, wherein the transmission behavior in said wavelength region is altered by said state of said heater.

7. An apparatus for performing simultaneous loop back test for a two cable bi-directional optical transmission system operating in a space division multiplexing (SDM) mode, transmitting a signal beam in two cables joining a network terminal and a line terminal; said apparatus having:

(a) a first 1×2 optical switch having: a first, a second, a third, and a fourth switch terminals; wherein; in a normal signal transmission mode, the first switch terminal is optically connected to the fourth switch terminal, and in a switch over mode, the first switch terminal is connected optically to the third switch terminal, and said first switch terminal is connected to an optical transmitter (OS) of said network terminal, and said fourth switch terminal is connected to the transmission cable;

(b) a second 1×2 optical switch having:

a first, a second, a third, and a fourth switch terminals; wherein, in a normal signal transmission mode, the first switch terminal is connected optically to the fourth switch terminal, and in a switch over mode, the first switch terminal is connected optically to the third switch terminal, and the first switch terminal is connected to an optical receiver (OR) of said network terminal and said fourth switch terminal is connected to the transmission cable; and (c) an optical attenuator inserted between the third switch terminal of said first 1×2 optical switch and said third switch terminal of said second 1×2 optical switch; said attenuator generating an attenuation whose magnitude is slightly smaller than the loss budget in the transmission cable between said line terminal and the network terminal.

8. A loop back/line test apparatus as claimed in claim 7, wherein said 1×2 optical switches are provided with a thermo-optic (TO) effect device fabricated integrally on a silicon substrate common with waveguides, said device comprises a thin film heater having an on-state and an off-state, wherein the transmission behavior in said wavelength region is altered by said state of said heater.

9. A loop back/line test apparatus as claimed in claim 1, wherein said 1×2 optical directional coupler comprises a first waveguides and a second waveguide wherein a portion of said first and said second waveguides is made proximal to each other at a specific parallel distance, and a user-side of said first waveguide is connected to said first switch terminal of said 2×2 optical switch, and a network-side of said first waveguide is connected to the user-side of said line terminal a user-side of said second waveguide is connected to said third switch terminal of said 2×2 optical switch, and a opposite open-end terminal of said second waveguide is sliced at an angle to the optic transmission path so as to prevent the Fresnel reflection from the surface thereof.

10. A loop back/line test apparatus as claimed in claim 2, wherein said 1×2 optical directional coupler comprises a first waveguide and a second waveguide wherein a portion of said first and said second waveguides is made proximal to each other at a specific parallel distance, and the user-side of said first waveguide is connected to said first switch terminal of said 2×2 optical switch, and the network-side of said first waveguide is connected to the user-side of said line terminal the user-side of said second waveguide is connected to said third switch terminal of said 2×2 optical switch, and the opposite open-end terminal of said second waveguide is sliced at an angle to the optic transmission path so as to prevent the Fresnel reflection from the surface thereof.

11. A loop back/line test apparatus as claimed in claim 5, wherein said 1×2 optical directional coupler comprises a first waveguide and a second waveguide wherein a portion of said first and second waveguides is made proximal to each other at a specific parallel distance, and a user-side of said first waveguide is connected to said first switch terminal of said 2×2 optical switch, and a network-side of said first waveguide is connected to the user-side of said network terminal a user-side of said second waveguide is connected to said third switch terminal of said 2×2 optical switch, and an opposite open-end terminal of said second waveguide is sliced at an angle to the optic transmission path so as to prevent the Fresnel reflection from the surface thereof.

12. A loop back/line test apparatus as claimed in claim 6, wherein said 1×2 optical directional coupler comprises a first waveguide and a second waveguide wherein a portion of said first and said second waveguides is made proximal to each other at a specific parallel distance, and a user-side of said first waveguide is connected to said first switch terminal of said 2×2 optical switch, and a network-side of said first waveguide is connected to the user-side of said network terminal a user-side of said second waveguided is connected to said third switch terminal of said 2×2 optical switch, and an opposite open-end terminal of said second waveguide is sliced at an angle to the optical transmission path so as to prevent the Fresnel reflection from the surface thereof.

13. A loop back/line test apparatus as claimed in claim 3, wherein said optical attenuator comprises a first and a second waveguides formed on a common silicon substrate, said waveguides in a parallel separation with each other to generate a coupling ratio dependent on said separation, wherein an input end of said first waveguide is connected to said third switch terminal of said first 2×2 optical switch, and an output end of said first waveguide, said output end outputting a desired magnitude of attenuation, is connected to said third switch terminal of said second 2×2 optical switch, and both ends of said second waveguide are inclined at an angle to the optic transmission path so as to prevent the Fresnel reflection from the surfaces thereof.

14. A loop back/line test apparatus as claimed in claim 4, wherein said optical attenuator comprises a first and a second waveguides formed on a common silicon substrate, sadi waveguides in a parallel separation with each other to generate a coupling ratio dependent on said separation, wherein an input end of said first waveguide is connected to said third switch terminal of said first 2×2 optical switch, and an output end of said first waveguide, said output end outputting a desired magnitude of attenuation, is connected to said third switch terminal of said second 2×2 optical switch, and both ends of said second waveguide are inclined at an angle to the optic transmission path so as to prevent the Fresnel reflection from the surfaces thereof.

15. A loop back/line test apparatus as claimed in claim 7, wherein said optical attenuator comprises a first and second waveguides formed on a common silicon substrate, said waveguides in a parallel separation with each other to generate a coupling ratio dependent on said separation, wherein an input end of said first waveguide is connected to said third switch terminal of said first 2×2 optical switch, and the output end of said first waveguide, said output end outputting a desired magnitude of attenuation, is connected to said third switch terminal of said second 2×2 optical switch, and both ends of said second waveguide are inclined at an angle to the optic transmission path so as to prevent the Fresnel reflection from the surfaces thereof.

16. A loop back/line test apparatus as claimed in claim 8, wherein said optical attenuator comprises a first and a second waveguides formed on a common silicon substrate, said waveguides in a parallel separation with each other to generate a coupling ration dependent on said separation, wherein an input end of said first waveguide is connected to said third switch terminal of said first 2×2 optical switch, and the output end of said first waveguide, said output end outputting a desired magnitude of attenuation, is connected to said third switch terminal of said second 2×2 optical switch, an both ends of said second waveguide are inclined at an angle to the optic transmission path so as to prevent the Fresnel reflection from the surfaces thereof.

17. A loop back/line test apparatus as claimed in claim 3, wherein said optical attenuator comprises a waveguide sliced and aligned at a distance by a specific separation distance, wherein slicing of the waveguide is made at an angle to said waveguide transmission path to prevent the Fresnel reflection from sliced open-end terminal surfaces.

18. A loop back/line test apparatus as claimed in claim 4, wherein said optical attenuator comprises a waveguide sliced and aligned at a distance by a specific separation distance, wherein slicing of the waveguide is made at an angle to said waveguide transmission path to prevent the Fresnel reflection from sliced open-end terminal surfaces.

19. A loop back/line test apparatus as claimed in claim 7, wherein said optical attenuator comprises a waveguide sliced and aligned at a distance by a specific separation distance, wherein slicing of the waveguide is made at an angle to said waveguide transmission path to prevent the Fresnel reflection from sliced open-end terminal surfaces.

20. A loop back/line test apparatus as claimed in claim 8, wherein said optical attenuator comprises a waveguide sliced and aligned at a distance by a specific separation distance, wherein slicing of the waveguide is made at an angle to said waveguide transmission path to prevent the Fresnel reflection from sliced open-end terminal surfaces.

* * * * *

UNITED STATES PATENT AND TRADEMARK OFFICE
CERTIFICATE OF CORRECTION

PATENT NO. : 5,319,482
DATED : June 07, 1994
INVENTOR(S) : Toshiyuki TSUCHIYA et al.

It is certified that error appears in the above-indentified patent and that said Letters Patent is hereby corrected as shown below:

Claim 1, column 9, line 13 change "Joining" to --joining--.

Claim 1, column 9, line 23 change "design" to --designed--.

Claim 1, column 9, line 35 change "Generated" to --generated--.

Claim 1, column 9, line 44 change "switch over" to --switchover--.

Claim 2, column 9, line 56 delete first occurrence of "through"

Claim 3, column 10, line 21 change "switch over" to --switchover--.

Claim 4, column 10, line 46, delete first occurrence of "through"

UNITED STATES PATENT AND TRADEMARK OFFICE
CERTIFICATE OF CORRECTION

PATENT NO. : 5,319,482
DATED : June 07, 1994
INVENTOR(S) : Toshiyuki TSUCHIYA et al.

It is certified that error appears in the above-indentified patent and that said Letters Patent is hereby corrected as shown below:

Claim 5, column 10, line 59 change "ration" to --ratio--.

Claim 5, column 11, line 8 change "switch over" to --switchover--.

Claim 5, column 11, lines 8-9 change "terminals" to --terminal--.

Claim 7, column 11, lines 26 change "wherein;" to --wherein,--.

Claim 7, column 11, line 29 change "switch over" to --switchover--.

Claim 9, column 11, line 64 change "waveguides" to --waveguide--.

Claim 9, column 12, line 9 change "a" to --an--.

UNITED STATES PATENT AND TRADEMARK OFFICE
CERTIFICATE OF CORRECTION

PATENT NO. : 5,319,482
DATED : June 07, 1994
INVENTOR(S) : Toshiyuki TSUCHIYA et al.

Page 3 of 4

It is certified that error appears in the above-indentified patent and that said Letters Patent is hereby corrected as shown below:

Claim 10, column 12, lines 20, 23, and 25 change "the" to --a--.

Claim 10, column 12, line 24 after "terminal" insert --,--.

Claim 10, column 12, line 28 change "the" to --an--.

Claim 11, column 12, line 44 after "terminal" insert --,--.

Claim 12, column 12, line 63 after "terminal" insert --,--.

Claim 13, column 13, line 5 change "waveguides" to --waveguide--.

Claim 14, column 13, line 20 change "waveguides" to --waveguide--.

UNITED STATES PATENT AND TRADEMARK OFFICE
CERTIFICATE OF CORRECTION

PATENT NO. : 5,319,482
DATED : June 07, 1994
INVENTOR(S) : Toshiyuki TSUCHIYA et al.

It is certified that error appears in the above-indentified patent and that said Letters Patent is hereby corrected as shown below:

Claim 15, column 13, line 35 change "waveguides" to --waveguide--.

Claim 16, column 14, line 5 change "waveguides" to --waveguide--.

Claim 16, column 14, line 7 change "ration" to --ratio--.

Claim 16, column 14, line 13 change "an" to --and--.

On title page, item [57]
Abstract, line 8, change "Generates" to --generates--.

Signed and Sealed this

Twenty-fifth Day of April, 1995

Attest:

BRUCE LEHMAN

Attesting Officer    Commissioner of Patents and Trademarks